UNITED STATES PATENT OFFICE 2,201,522

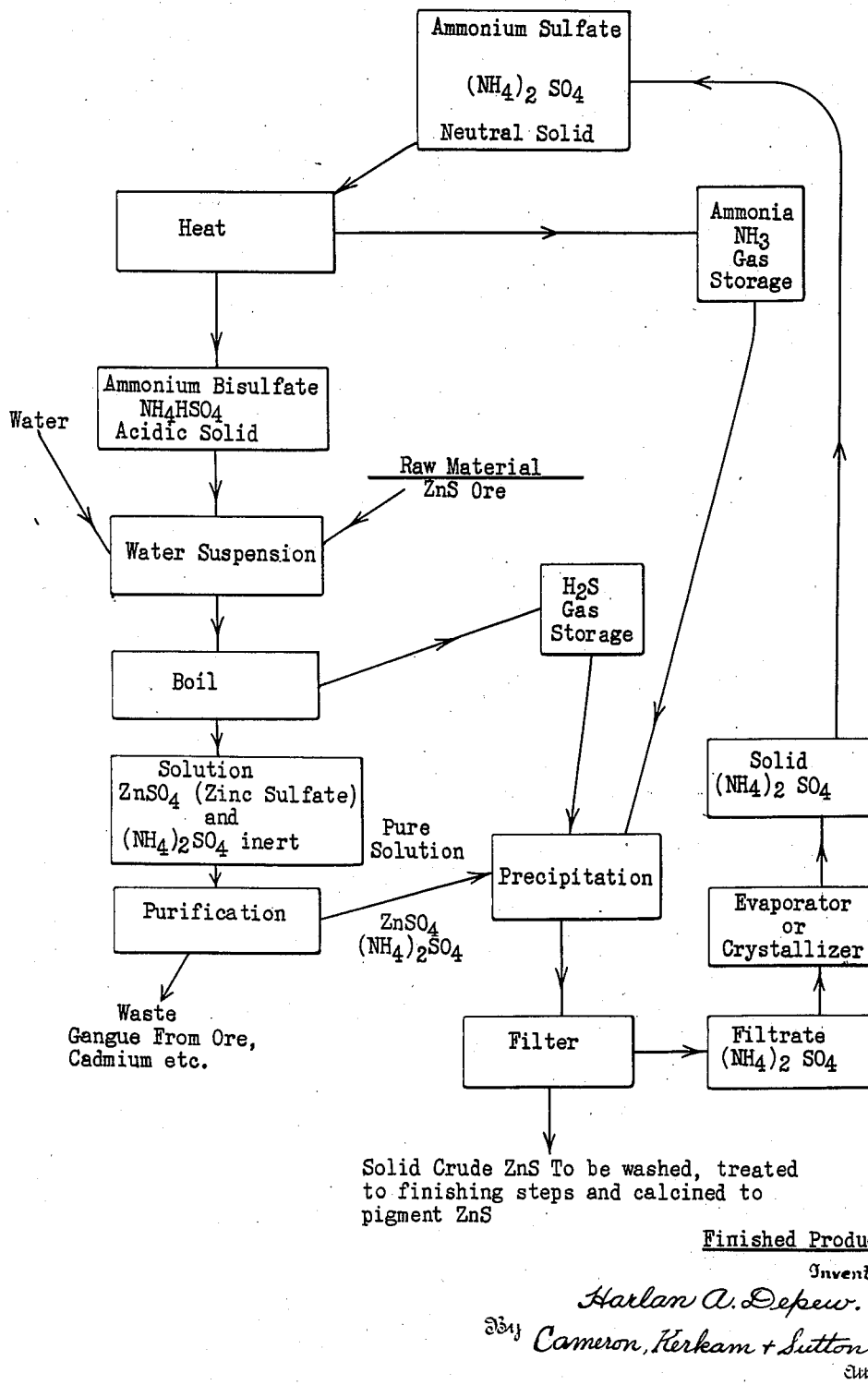

METHOD OF MAKING ZINC SULPHIDE

Harlan A. Depew, Columbus, Ohio, assignor to American Zinc, Lead & Smelting Company, St. Louis, Mo., a corporation of Maine Application November 2, 1938, Serial No. 238,453

1 Claim. (Cl. 23—135)

This invention relates to the production of zinc sulphide pigment and has for its object to provide a new and improved method of making the same.

There are two known methods in use at the present time for producing zinc sulphide from zinc sulphide ore, one of which may be called the "sulphide acid process" and the other of which may be called the "thiosulphate process".

In the sulphuric acid process resort is had to the following reaction, to wit:

(1) $ZnS + H_2SO_4 \rightleftarrows ZnSO_4 + H_2S$

In this process the ore is first reacted with sulphuric acid and the hydrogen sulphide gas is driven off, collected and purified. The zinc sulphate solution is separated from the gangue and purified. After such purification the hydrogen sulphide gas is reacted with the purified zinc sulphate solution and the zinc sulphide is precipitated. Unfortunately, however, the reactions will not go to the right at will and then to the left by just writing them that way. Many expedients have been resorted to to drive the reactions to the left during precipitation, but this reaction has not proceeded to completion—even worse, the product is of poor quality. Color, hiding power and whitening strength (sometimes called tinting strength) are relatively poor. This is probably due in no small part to the fact that the precipitate comes down in a finely divided form and the particles flocculate and entrap impurities. To obtain pigment properties by this process it is necessary to age the produced precipitate in the liquors to grow the particles to the required size. Moreover, the uneven size of the particles probably accounts for the poor hiding power and the muddy tone in tints. The occluded materials may partially explain the poor color.

The thiosulphate process when carried out in strict accordance with the theory, makes a zinc sulphide that is recognized as having superior properties. These superior properties are believed to be due to the uniformly sized pigment particles of optimum hiding power. In the practice of this thiosulphate process, the product is made by reacting ammonium bisulphate (NH$_4$HSO$_4$) with zinc sulphide ore to form zinc sulphate and ammonium thiosulphate, (NH$_4$)$_2$S$_2$O$_3$. These materials are purified and reacted in the presence of (NH$_4$)$_2$S and ammonia. The resultant (NH$_4$)$_2$SO$_4$ is used to form ammonium bisulphate (NH$_4$HSO$_4$) to react with the zinc sulphide ore. The process is cyclic and requires (on paper) only coal and ore plus material to replace the losses and reactions due to impurities in the ore. One of the difficulties in practicing this thiosulphate process lies in the fact that the reaction of the ammonium bisulphate and zinc sulphide ore has to be produced by reacting in a furnace, and it is necessary that the furnace be air tight. However, due to pastiness of the charge and other features, the furnace has to be opened and this causes oxidation, and the ammonium thiosulphate is not always formed. Moreover, there is a serious corrosion of the furnace and possible side reactions.

By the improved process of the present application the troubles and difficulties experienced in both of the aforementioned processes are obviated. The practice of the invention will be readily understood by reference to the accompanying diagram from which it will appear that the process is cyclic. Heat is applied in any suitable way to ammonium sulphate and as a result ammonia gas is given off and carried to storage, leaving solid ammonium bisulphate that is acidic. This ammonium bisulphate is dissolved in water and zinc sulphide ore is added thereto and held therein in suspension. The whole is then boiled, and the hydrogen sulphide gas given off is carried to storage and the zinc sulphide ore brought into solution, thus producing a solution of zinc sulphate and ammonium sulphate. This solution, containing zinc sulphate and inert ammonium sulphate is purified, and the pure solution is transferred to a precipitation tank where the ammonia gas formed by heating the ammonium sulphate and the hydrogen sulphide gas generated on boiling the water suspension are added to the precipitation tank, resulting in the precipitation of zinc sulphide. The precipitate of zinc sulphide is then filtered from the solution and may be subjected to the usual steps for making pigment zinc sulphide. The filtrate containing the valuable ammonia sulphate, (NH$_4$)$_2$SO$_4$, is sent to an evaporator or crystallizer from which the solid salt (NH$_4$)$_2$SO$_4$ is obtained which is returned to the starting point shown at the top of the diagram.

Experience in the old thiosulphate process heretofore referred to indicates that the reaction is as follows:

(2) $2NH_4HSO_4 + ZnS \rightarrow$
$ZnSO_4 + S + SO + NH_3 + 2H_2O$

However, this reaction, since it is carried out in a furnace, occurs as a dry reaction. I have discovered, however, that when carried out in water this reaction occurs as (3) $2NH_4HSO_4 + ZnS \rightarrow ZnSO_4 + (NH_4)_2SO_4 + H_2S$ as indicated in the accompanying diagram.

Preferably the zinc sulphide ore, when introduced into the solution of ammonium bisulphate, should be about 100–200 mesh to be fine enough to react at a reasonable speed and yet coarse enough to wet well. If the ore is too fine it may be poorly wet and reaction will be slow.

After the zinc sulphate solution is secured by the boiling step the process may be varied somewhat, but in the preferred form, the zinc sulphate solution is purified and then saturated with ammonia, with the result that the zinc is in the form of a complex ammonia addition compound. With the zinc sulphate in the solution there is a considerable amount of ammonium sulphate $(NH_4)_2SO_4$, and I pass the hydrogen sulphide gas [evolved upon boiling ammonium bisulphate with the zinc sulphide suspended therein, see Equation 3] into the ammoniacal zinc solution and precipitate the zinc sulphide which is filtered, washed and calcined by well known methods. The ammonium sulphate in the filtrate is recovered for reuse in the cyclic process. The result is zinc pigment of superior properties which I ascribe to two factors, though I do not intend to be bound thereby. These two factors are—

1. The zinc is present as a complex ion and therefore the reaction is not instantaneous as in the simple ionic reaction, and this slower reaction causes the precipitate to be more crystalline or less colloidal.

2. The salt dissolved in water may be considered as solvated, and therefore the solution is less water-like. As a matter of fact, a water solution of organic salts can be made to dissolve organic material. Accordingly, through the presence of ammonium sulphate, the dissociation into ions can be further repressed with the result that the reaction can be slow and the product made more crystalline.

As an example of this process 100 grams of ammonium sulphate were heated giving off ammonia gas and yielding 85 grams of ammonium bisulphate. This was wet with 75 cc. of water and 30 grams of ZnS ore containing 90% ZnS was added. On boiling, hydrogen sulphide gas was copiously evolved and carried to storage. The zinc sulphate solution was then filtered and purified, ammonia gas was added followed by $H_2S$, and zinc sulphide in an easily filterable form was obtained. After calcination 25 grams of zinc sulphide pigment was obtained of a high brightness, light stability and hiding power.

It may sometimes be desirable to crystallize some of the $(NH_4)_2SO_4$ from the zinc sulphate solution before precipitation, but in the general practice I prefer to leave the ammonium sulphate in the zinc solution during precipitation of the zinc sulphide.

The product of this invention has superior light resistance which I attribute to the presence of ammonium sulphate which it is believed hinders adsorbtion of chlorides that cause light darkening. In the cyclic process it is advantageous to use additional ammonia over that generated from heating ammonium sulphate, but this is not lost and can be used over and over again.

In the precipitation of the purified zinc sulphate and ammonium sulphate solution good results have been obtained by alternately adding the solution and hydrogen sulphide gas although this is not the preferred practice.

What is claimed is:

The cyclic process of making zinc sulphide which consists in heating a body of ammonium sulphate and storing the resulting ammonia gas, dissolving the resulting ammonium bisulphate in water, suspending comminuted zinc sulphide ore in the solution, then boiling the solution and storing the hydrogen sulphide gas thus driven off, thus leaving a solution of zinc sulphate and inert ammonium sulphate, then introducing stored ammonia gas and hydrogen sulphide gas into the purified solution, separating the resulting zinc sulphide precipitate from the solution, then evaporating the solution and returning the solid ammonium sulphate to the starting point.

HARLAN A. DEPEW.